United States Patent
Wells et al.

(10) Patent No.: US 12,191,660 B1
(45) Date of Patent: Jan. 7, 2025

(54) FAST CONTROL OF POWER GRIDS USING STREAMING PROTOCOL

(71) Applicant: PXiSE Energy Solutions, LLC, San Diego, CA (US)

(72) Inventors: Charles H. Wells, San Diego, CA (US); Raymond A. de Callafon, San Diego, CA (US); Patrick T. Lee, San Diego, CA (US)

(73) Assignee: PXISE ENERGY SOLUTIONS, LLC, San Diego, CA (US)

( * ) Notice: Subject to any disclaimer, the term of this patent is extended or adjusted under 35 U.S.C. 154(b) by 0 days.

(21) Appl. No.: 18/627,226

(22) Filed: Apr. 4, 2024

(51) Int. Cl.
*H02J 13/00* (2006.01)
*H02J 3/18* (2006.01)
*H04L 67/125* (2022.01)

(52) U.S. Cl.
CPC .......... *H02J 13/00028* (2020.01); *H02J 3/18* (2013.01); *H02J 13/00002* (2020.01); *H04L 67/125* (2013.01); *H02J 2203/10* (2020.01)

(58) Field of Classification Search
CPC .. H02J 13/00028; H02J 3/18; H02J 13/00002; H02J 67/125; H02J 2203/10
See application file for complete search history.

(56) References Cited

U.S. PATENT DOCUMENTS

| | | | | |
|---|---|---|---|---|
| 11,955,797 B1* | 4/2024 | Vergara | ............. | H02J 13/00002 |
| 2009/0281673 A1* | 11/2009 | Taft | ......................... | G05B 15/02 |
| | | | | 700/286 |
| 2010/0070213 A1* | 3/2010 | Anklam | ............ | H02J 13/00002 |
| | | | | 702/60 |
| 2010/0292857 A1* | 11/2010 | Bose | ................. | H02J 13/00002 |
| | | | | 702/62 |

OTHER PUBLICATIONS

Liu et al., Stability and Control of Power Grids, 2022, Annual Review of Control, Robotics, and Autonomous Systems, p. 689-746. (Year: 2022).*

* cited by examiner

*Primary Examiner* — Kidest Bahta
(74) *Attorney, Agent, or Firm* — Gray Ice Higdon

(57) ABSTRACT

Implementations are directed to aspect(s) of a fast feedback control system that actively stabilizes a geographically dispersed power grid by e.g., providing capabilities to match supply and demand at a high update rate. Implementations enable fast measurements of properties of the power grid and fast control parameter(s) back to controllable resource (s) in the power grid, such as control parameter(s) back to battery storage units, solar generation curtailment, wind generation curtailment, EV charging systems, and/or HVAC systems. In various implementations, the fast measurements and/or the fast control parameters can continuously occur at an update rate that is faster than once per second, such as at an update rate greater than 10, 20, 30, 40, 50, or 60 Hz. For example, measurements from a controllable resource can be transmitted to a geographically remote parent controller at 60 Hz and responsive control parameters can be received at the controllable resource at 60 Hz.

30 Claims, 6 Drawing Sheets

FAST CONTROL OF POWER GRIDS USING STREAMING PROTOCOL

BACKGROUND

Electric power systems, such as generation, transmission, distribution, and/or behind the meter (BTM) networks, are undergoing a radical change in power flow and quality. This is due to increasing variable renewable resources within a diverse mix of distributed generation, energy storage units, and/or intermittent Electric Vehicle (EV) loads-resulting in significant impacts on stability and reliability due to both a decrease in rotating inertia from conventional generation and variability of distributed load and generation. These variable disturbances to the grid have an adverse impact on the electric system since the multi-directional power flow and local load reactance have large impact on the power flow operating capacity of the network and power quality and also affect the stability with system dynamics driving the power network toward their local resonance frequency.

Non-limiting examples of particular grid disturbances include volatile solar and/or wind generation in segments of the electric grid and/or rapid load changes that include, but are not limited to, EV charging and HVAC start/stop in the distribution network. These volatile and rapid variations between power supply and demand may occur both in front of the meter (FTM) and BTM scenarios. The displacement of traditional spinning generation by renewables and inverter-based resources is also reducing the available fault current that affects existing protective relay and fuse operations that protect the power network from electrical faults.

To mitigate adverse impacts from these and/or other dynamic changes in the grid, fast distributed control systems can be utilized. For example, component and project level solutions are being explored to address supply and demand variability in the grid. To be effective, such solutions require the ability to measure and process rapid power flow fluctuations and to quickly respond and dispatch distributed energy resources to be able to match supply and demand. Measuring power flow fluctuations and/or dispatching distributed energy resources can heavily rely on network communications. However, existing secure network communications may only provide slow response times in the order of more than a second, more than multiple seconds, or even in the order of minutes.

Some faster mitigation approaches for power supply and demand imbalance have been proposed in local-only electrical components such as a battery energy storage system (BESS). However, such approaches require a local system controller that is hard-wired with the BESS and/or require a local area network (LAN) between the system controller and the BESS to achieve sub-second control and response. In some applications, time-synchronized data such as phasor measurements are communicated to the controllers as input signals over a dedicated private LAN or through a virtual private network (VPN) over a data network to minimize data loss and data transmission time. In other words, with such approaches the achievement of fast sub-second control of BESS and/or inverter-based resources by the system controller is dependent on a low latency data communication system which can be resource intensive to implement and/or to maintain—and can be impractical to implement and/or maintain on a large scale in a large power grid with grid components that are geographically distributed over a large area (e.g., where parent controllers are miles away from controlled resource(s), or being hosted in the cloud).

SUMMARY

Implementations of the present disclosure are directed to one or more aspects of a fast control system (e.g., a feedback control system) that actively stabilizes a power grid by e.g., providing capabilities to match supply and demand at a much higher update rate. Implementations enable fast measurements of key properties of the power grid and fast signals (e.g., control parameters) back to controllable distributed energy resources in the power grid, including, but limited to signals back to battery storage units, solar generation curtailment, wind generation curtailment, EV charging systems, and/or HVAC systems.

In some of those implementations, the fast measurements and/or the fast control signals can continuously occur faster than once per second, such as at a rate greater than 10, 20, 30, 40, 50, or 60 Hz. For example, measurements can be streamed to a remote parent controller at a rate of 60 Hz and corresponding control parameters can be received back at a rate of 60 Hz, enabling high-rate control of resources of the power grid and ensuring stability of the power grid. Although there may be, due to latency of a public network, a delay of tens or hundreds of milliseconds between sending of a measurement and sending of a responsive control parameter, the fast rate of sending measurements and sending responsive control parameters enables high-rate control of resources of the power grid. Such high-rate control can prevent resources of the power grid and/or the power grid as a whole from becoming unstable. In various implementations, synchronized timestamps (e.g., synchronized to a Global Positioning System (GPS) clock or to a standalone precision clock such as the precision time protocol grandmaster clock) that each correspond to a corresponding measurement time, can be included with transmitted measurements and with responsive transmitted control parameters. This can enable a parent controller, a child controller, and/or an automatically controllable resource to utilize the synchronized timestamps in ensuring appropriate control of resources of the power grid.

As a non-limiting example, measurements from a controllable resource can be transmitted to a geographically remote parent controller at 60 Hz and responsive control parameters, generated by the parent controller based on the measurements, can be received at the controllable resource at 60 Hz. Synchronized timestamps can be included with the measurements and with the control parameters. For example, a first measurement can have a first timestamp and a first control parameter generated based on the first measurement can have the first timestamp, a second measurement can have a second timestamp and a second control parameter generated based on the second measurement can have the second timestamp, etc.

Utilization of the synchronized timestamps, for measurements, can enable the parent controller to process received measurements in accordance with a time they were measured as opposed to a time they are received by the parent controller—as receipt time of measurements can be milliseconds later than their measurement time and/or can be out of order relative to their measurement time (e.g., a later in time measurement received before an earlier in time measurement). Processing received measurements in accordance with the time they were measured enables a parent controller to, for example: ensure generated control parameters (e.g., feedback based) are generated based on an appropriately ordered sequence of measurements (e.g., ensure that an earlier in time measurement is utilized in generating control parameter(s) prior to utilization of a later in time measurement); temporally align measurements from a first resource with received measurements from separate resource(s) and generate control parameter(s) based on such alignment (e.g., generate control parameter(s) for an automatically controllable resource based on two or more separately received measurements); determine (e.g., based on a determined time delay) which earlier transmitted control parameter(s) are influencing measurements that are currently being processed; etc.

Likewise, utilization of the synchronized timestamps, for measurements, along with the control parameters can enable a child controller and/or a controllable resource to process received control parameters in accordance with measurement times to which they correspond as opposed to a time they are received. Processing control parameters in accordance with the measurement times to which they correspond enables a child controller and/or automatically controllable resource to, for example: ensure control parameters are implemented in an appropriately ordered sequence (e.g., ensure that a control parameter corresponding to an earlier in time measurement is implemented prior to implementation of a control parameter corresponding to a later in time measurement); determine a current time delay based on a difference between a synchronized timestamp for a most recently received control parameter and a current synchronized timestamp; utilize the current time delay for providing with corresponding measurements to a parent controller for improved control by the parent controller; utilize the current time delay in determining whether to implement the control parameter (e.g., bypass implementing if the current time delay exceeds a threshold); etc.

Some implementations achieve fast sub-second feedback control of end devices (also referred to herein as controllable resources) over a public data network (e.g., the Internet and without any usage of a virtual private network) using a two-way data streaming protocol that operates continuously between a parent controller and child controller(s). Each of the child controller(s) can control and/or monitor one or more end device(s) and some of the child controller(s) can themselves also serve as a parent controller to further child controller(s) in a hierarchical arrangement. For example, some of those implementations can achieve, over a public data network such as the Internet, fast sub-second feedback control of BESS loads, inverter-based loads, and/or other controllable resources that are controlled by child controller (s). Some versions of those implementations use a child bidirectional streaming data handler (BSDH), associated with (e.g., in local communication with) a child controller, that continuously breaks down long input data messages (e.g., from controllable resource(s) and/or sensor(s)) into smaller fragments that are communicated through the Internet in many data paths—and the data fragments reach a parent BSDH, associated with (e.g., in local communication with) a parent controller, at a low latency (e.g., in less than one second, in less than half a second, in less than one-tenth of a second). The parent BSDH reassembles the received data fragments to their original format and provides them to the parent controller, all within a fraction of a second of the data fragments being transmitted. The parent controller processes the original format data and generates resulting control parameter(s) (e.g., power set point(s), voltage set point(s), frequency set-point(s), angle set point(s), on/off command(s), and/or other control parameter(s)) for the end-devices. The parent BSDH can be used to break down the output data message into fragments and send them through the public data network to reach the child BSDH(s), where the data fragments will be re-assembled and passed, in their original format, to the child controller(s). This two-way streaming communication occurs continuously at a high rate to achieve a low latency feedback control between the parent controller and child controller(s) that achieves fast sub-second responses repeatedly. In these and other manners, fast feedback control of the power grid can be achieved to mitigate adverse impacts from grid disturbances.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
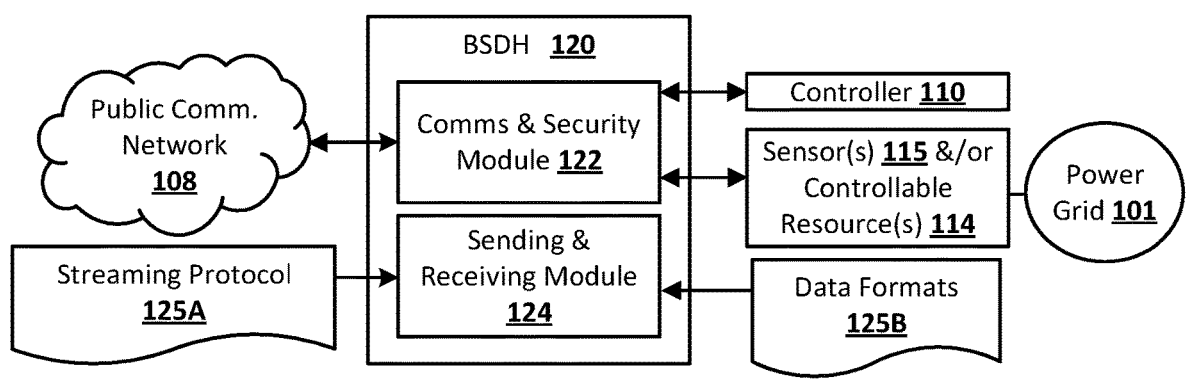
FIG. 1 schematically depicts an example bidirectional streaming data handler (BSDH) and an example environment in which the BSDH can be implemented, in accordance with various implementations.

Prior to turning to the figures, a non-limiting overview of various implementations is provided.

Implementations disclosed herein continuously, at a parent or system controller, receive data from sensor(s) of a power grid and/or receive data from and/or transmit data to controllable resource(s) of a power grid. Those implementations receive and/or transmit such data with sub-second latency over a public data network with multiple data communication paths, such as the Internet, and without any utilization of a virtual private network.

Many sensors of a power grid can communicate at a data rate up to a few hundred times per second. However, only some types of controllable resources have communication and control response times that are in milliseconds, such as AC-DC, DC-AC and DC-DC inverters, load controllers, and load isolators. Some examples of DC-AC inverters are found in Solar Photovoltaic (PV) and BESS, where the solar PV and BESS inverters have built-in data communications and local control functions. An example of a controllable resource isolator is a circuit breaker that is actuated with external analog or digital signals.

Some prior approaches, to achieve continuous sub-second feedback control between a system controller and input sensor(s) and controlled object(s), either require that local controllers be hard-wired with the BESS and/or require a local area network (LAN) for fast data communications between the controller and the BESS to achieve sub-second control and response. In some of those prior approaches, very fast time-synchronized data such as phasor measurements are communicated to the system controllers as input signals over a private LAN or through a virtual private network (VPN) over a public data network. In other words, the achievement of fast sub-second control of BESS and inverter-based resources by the system controller with such prior approaches is dependent on a dedicated low latency data communication system. However, using a LAN and/or a VPN over a public data network is not feasible when there is a large quantity of controllable resources that are widely geographically distributed in an electrical network (e.g., distributed across many miles). For example, it is costly and time-consuming to establish, configure, and maintain more than a few VPN services and is difficult to manage the cyber security of the control system.

There is an existing application of streaming synchrophasor messages for data storage using the IEEE 2664 streaming data protocol. The existing application includes components that provide data transmission one-way from the data source to the destination using the Internet.

One approach to communicating data over a public data network is to send data, from sensors, through a data handler to a receiver and then to a data historian for recordation of the sensor data. This is a one-way flow of information that is not used to make an immediate (e.g., sub-second) response. The information is generally contained in a long data message of information that is broken down into smaller packets for transmission over a public or private network. The reassembly of the long data message at the receiving end often results in errors due to missing or corrupted small packets and, hence, the entire long data message is lost. This results in data dropout where a percentage of valuable information is lost. The application of a data handler, using the IEEE 2664 streaming data protocol, to transmit long synchrophasor messages one-way has been practiced and has reduced data transmission errors for data acquisition from sensors.

Implementations disclosed herein relate to using streaming protocol(s) bi-directionally over the Internet to achieve secure and fast communications between controllable resources and a system controller, and between the sensors and the system controller, in a hierarchical manner that can be cascaded and scaled in multiple levels. More particularly, some of those implementations relate to the use of bi-directional streaming data handlers (BSDHs) with built-in streaming data protocol(s) to achieve secured, fast, low data dropout, two-way communications between a system controller and controlled device(s) that are connected in an electrical network, and at least one-way communications from sensor(s), that are connected in the electrical network, and the system controller. In some of those implementations, synchronized timestamps for measurement times are provided along with measurements and are provided along with control parameters determined based the measurements and enable controllers and/or controllable resources to utilize the synchronized timestamps in ensuring stable control of resources of the power grid. Additionally, the BSDH(s) can optionally process messages in different data formats in the corresponding native protocols of the end devices. For example, Modbus, DNP3, or OPC are common data communication protocols between controllers and end devices.

To achieve fast feedback control of controllable resources, the rate and/or speed of data communication for implementations disclosed herein are much faster than traditional supervisory control and data acquisition (SCADA) systems that are typically operating at one to four second intervals. Faster data rates are needed for control of the power grid with fast supply and demand variability, such as data rates of 10 to 60 samples per second or higher. Higher data rates can optionally be enabled as data communications hardware and/or software advances to handle larger data volume and/or to reduce data communications latency. For example, a software data ride-through function can address missing data and avoid the erosion of communications latency in a fast feedback control system according to implementations disclosed herein.

Implementations of fast feedback control disclosed herein provide sub-second control of a large quantity of geographically dispersed and controllable devices, enable that control over a public data network, and includes components that transmit data bi-directionally through the public data network securely at a low latency. This can enable communications between the controller and the controlled devices with communication performance comparable to a physical LAN, but without various drawbacks of a physical LAN and while enabling communications with geographically dispersed power grid resources.

The controller component can be, for example hardware and/or software that can process input data from sensors and devices and provide output commands to the controlled devices.

The sensors can be, for example, capable of communicating messages using one or more data protocols. An example of a sensor is a protective relay used in a power system that is connected to current and voltage transformers for measuring power system parameters. Examples of data protocols include C37.118 synchrophasor messages and Modbus data messages.

The controllable resources can be, for example, capable of sending messages using one or more data protocols to the system controller through a bi-directional streaming data handler (BSDH) and also capable of receiving messages using one or more data protocols from the BSDH to actuate power flow to and/or from the electric network. Some examples of a data protocol that can be used in end devices include Mobus, DNP3.0, IEEE 2030.5, and IEEE C37.118.

A BSDH can send and receive messages in one or more data protocols and utilizes one or more streaming data protocols for data transmission through a public data network. The BSDH uses one or more streaming data protocols to break down a long complete message from a sensor or controlled device to smaller data packets for sending through the public data network and/or to reassemble smaller data packets into a complete message before sending the complete message to a controller or controllable device. When two or more BSDHs are deployed, a parent BSDH serving a system controller and a child BSDH serving sensor(s) and/or controlled device(s) can effectively create a direct virtual data connection, between the system controller and the sensor(s) and/or the controlled device(s), where the direct virtual data connection is over the public data network with low latency communication performance comparable to a physical LAN. This fast virtual connection between controllers and controlled devices provides sub-second fast feedback control of many controlled devices, provides such fast feedback control over a public data network, and enables time-synchronized control of controllable devices that are distributed across a large geographical region.

Functions of a BSDH can include a data communications and security manager function and a sending and receiving data processor function. The data communications and security manager function can be responsible for the public data network interface. For example, it can identify the sender and receiver of a message, the specific data message format of the message, the specific streaming data protocol of the message, and handle the data security. The sending and receiving data processor function can use the configured streaming data protocol to process the specific data message for either sending or receiving, according to the identified streaming data protocol and specific data message format. The available streaming data protocols and data message protocols can be available from one or more software libraries. A BSDH can be a data server and/or a data client depending on its functions in communicating with other component(s) of the power grid. For example, when a BSDH is integrated with sensor(s) only, it can function as a sending entity only. When a BSDH is integrated with a controller or with an end device, it can function as both a receiving entity and a sending entity.

A non-limiting example of a feedback control system includes processing of measurements of variable(s) being controlled and generating corresponding control parameter(s) that are provided back to a controllable resource that is used to control the variable(s). One example of such a controllable resource is a battery unit with an inverter that injects power into the grid or absorbs power from the grid. Bi-directional messages can be used to achieve direct and continuous control. Implementations disclosed herein use a BSDH for control. For example, in an application of power flow control from a battery, the flow of power is controlled by measuring the power flow between the electric network and the inverter that is integrated with the battery. The data communicated between the controller and the controlled devices and sensors can include both time-synchronized data with synchronized timestamps and non-time-synchronized analog data contained in an IEEE C37.118 message. This information can be sent to the BSDH that communicates the message to the controller. The communicated message is processed by the controller to determine the power setpoint message (one example of a control parameter) to send back to the inverter to cause the power flow at the inverter to equal the power setpoint requested by the controller. This process is repeated at high data rates, such as a rate from 10 to 60 times per second to achieve timely power control to mitigate fast variability from renewable energy resources. Such fast feedback control between controller and controllable resources communicated over a public data network can require a bi-directional streaming data protocol to achieve low latency, secured, and reliable communications continuously.

In some implementations, one or more requirements may be necessary for a bi-directional streaming data protocol to achieve high-volume, high-speed, compact transfer of time-series data consistently and securely from publisher to subscriber with minimal loss through controlled packet sizing and data management. Such requirements can include one or more of (i) a publish and subscribe transport protocol for targeted data transmission; (ii) a simple command and response architecture; (iii) publisher capability to control both data and metadata accessibility for individual subscribers at the measurement level; (iv) limiting subscribers to only the data and metadata they are authorized to receive; (v) using multiple communication channels for transport, such as phasor channels and analog channels; (vi) supporting time series data with high resolution timestamp format at 100 nanosecond resolution (e.g., GPS synchronized timestamps); (vii) supporting time-synchronized data and non-time-synchronized analog data transmission (viii) supporting different publication frequencies, for example: publish time-synchronized data and non-time-synchronized data at different publishing frequency; (ix) providing protocol security function at the transport layer (TLS); (x) providing a data encryption function; and/or (xi) providing a data compression function.

A non-limiting example of a streaming data protocol that can be used to achieve one or more of these requirements is described by the IEEE 2664 standard. The streaming data protocol that is described by the IEEE 2664 standard is an example of one data streaming protocol that can be used to process power system parameters such as C37.118 messages with secured communications over a public or private data network. The Internet is one example of a public data network where the sending and receiving of data occurs.

The Internet Protocol divides messages into multiple fragments that are typically less than 1500 bytes for Ethernet networks. Each fragment is called a packet.

Time-synchronized Phasor Measurement data in the C37.118 messages contain long messages that exceed the Maximum Transmission Unit (MTU) specifications in the Internet Protocol. Accordingly, such data can be broken up into fragments.

Network packets can only be sent one packet at a time and when two or more packets arrive at the same time the result is a collision, resulting in one of the packets getting dropped and needing to be retransmitted. True collisions are generally rare or nonexistent, as network infrastructure increasingly uses switch-based technology with physical links that are full-duplex with no shared channels making collisions unlikely. However, heavy network traffic can cause similar issues. As a network is a weakest link problem (e.g., can only move data at the rate of the slowest part of the path), when two or more devices are simultaneously transmitting data at high speed to a single device, the switch can find itself in a position where it cannot send all the traffic to the destination port. This is not considered a collision, but the result will be an initial buffering until the limited memory on the switch is consumed and then it will drop packets.

Switch technology can also allow for a pause frame that is used for flow control at the Ethernet layer. When the connected devices have enabled support for the pause frame, the pause frame is normally sent when the device is overloaded with data. In such a case the data will get buffered, by the sender, inducing delays. However, if the sender buffers to capacity, the result is still the same, dropped packets.

The most common Internet protocol, TCP/IP, creates an index for each of the network packets being sent for a frame of data and verifies that each is successfully delivered, retransmitting packets as many times as needed in the case of loss. This functionality is the basis for TCP being considered a reliable data transmission protocol. Since each data packet for the transmitted frame is sequentially ordered, TCP can fully reconstruct and deliver the original frame once all the packets have arrived. However, for exceptionally large frames of data this causes TCP to suffer from the same kinds of impacts on memory allocation and computational burden. The unique distinction for IP based protocols is that at some level, these issues also affect every element of the interconnected network infrastructure between the source and sync of the data being exchanged. Another critical impact that is unique to TCP is that for data that needs to be delivered in a timely fashion, retransmissions of dropped packets cause cumulative time delays, especially as large data frames are published at rapid rates. Time delays are also exacerbated during periods of increased network activity which induces congestion and a higher rate of collisions or buffering.

Synchrophasor data has been used for some real-time visualization and analysis tools which provide insights to operate both the bulk electric system (BES) and the distribution system. This real-time data must be accurate, dependable, and timely to be useful for grid operators and feedback control systems. Any delays in delivering this data will adversely affect operational decisions of the control systems.

Another common Internet protocol is UDP/IP. Transmission of data over UDP differs from TCP in that UDP does not attempt to retransmit data, nor does it make any attempt to maintain the order of the transmitted packets. This functionality is the basis for UDP being considered a lossy data transmission protocol, but more lightweight than TCP.

Even with the unreliable delivery, UDP is still limited to packet sizes of the MTU. Any frame larger than the MTU must be split into multiple smaller packets. UDP attempts to reconstruct and deliver the originally transmitted frame of data. However, if even a single network packet is dropped, the entire original frame is lost and any packets that were already accumulated get discarded. In other words, there are no partial frame deliveries with UDP.

Since UDP attempts frame reconstruction with the received packets, the impact of large frames of data with UDP are similar to those with TCP and serialization technologies in that there is increased memory allocation and computational processing throughout the network infrastructure. The more problematic impact with UDP and large frames of data is that the increased number of network packets needed to send a large frame also increases the probability of dropping one of those packets due to a collision. Since the loss of any one packet results in the loss of the entire frame of data, as frame size increases, so does volume of overall data loss.

For synchrophasor measurement data, UDP is often the protocol of choice. The density of synchrophasor data allows analytical applications to tolerate some loss. The amount of loss that can be tolerated depends on the nature of the analytic because as the loss increases, the confidence in the analytic results decreases. Another reason UDP is used for synchrophasor data is its lightweight nature as use of UDP reduces overall network bandwidth requirements as compared to TCP. Yet another reason for use of UDP for synchrophasor data is that UDP does not suffer from issues with induced time delays caused by retransmission of dropped network packets.

For IEEE C37.118 deployments, large frame sizes can have adverse effects on data completeness since, as more and more devices are concentrated into a single frame of data, the larger frame sizes contribute to higher overall data losses. For example, measured overall data loss for the transmission of synchrophasor data using IEEE C37.118 can average over 2% when using a data rate of 30 frames per second and more than 3,100 data values per frame. To help mitigate the data losses when using UDP, some approaches have resorted to purpose-built, dedicated synchrophasor networks. Although a dedicated network can reduce data loss (e.g., minimizing simultaneous network traffic results in fewer collisions), this is a resource prohibitive option.

In view of these and/or other considerations, some implementations disclosed herein use, as a streaming data protocol the Streaming Telemetry Transport Protocol (STTP) protocol defined by IEEE 2664, and use the STTP protocol over a public network, such as the Internet. Instead of serializing an entire data structure as a unit, STTP is designed to package each of the distinct elements of the data structure into small groups. Serialization is managed for each data element, typically a primitive type, that gets individually identified along with any associated state such as time and/or quality information. With STTP more information is being sent, but it is being packaged differently. By sending the primitive measurement units directly instead of as a full structure, many advantages are realized.

To resolve issues with large frame impacts on IP based networks, a primary tenet of the STTP design strategy is to reduce fragmentation. As a result, STTP intentionally limits the number of data points that are grouped together to form a frame to ensure its size is optimized for transmission over an IP network with minimal fragmentation. Because each data point is uniquely identified, the elements that appear from one frame to another are not fixed, thereby allowing interleaving of data from multiple simultaneous data exchanges. This notion supports the delivery of any number of data structures where each can have a different publication interval.

For feedback control applications, two-way data flow is necessary. This is to allow the control system to receive real time data, compute the next control action, and then generate control instructions at the next data interval. In many applications the data rate will be greater than 1 Hz, such as at 50 or 60 Hz, to effectively control the system.

The STTP protocol enables two-way data flow. For normal STTP connections established using IP sockets, the details of establishing a socket connection are specific to the operating system and the specific programming language used. However, in generally terms, the minimum information needed to create a socket is (1) an endpoint, e.g., an IP address and port number, (2) the desired IP transport protocol, e.g., TCP or UDP, and (3) the type of connection to be established, e.g., a server-style socket or a client-style socket. A server-style socket is one that listens for connections from clients. A client-style socket is one that connects to a listening server socket. Client-style sockets are always the initiators of any given connection, i.e., client sockets always "make the call" to server sockets to begin communications.

There are situations where the data sender in STTP should be the initiator of the socket connection for security reasons. Under typical conditions STTP publishers will set up a server style listening socket, and STTP subscribers, as data consumers, will use client-style sockets to initiate connections to a publisher's listening socket. Establishing a server-style socket for a publisher and client-style socket(s) for any subscribers describes a connectivity model for STTP that is called a forward connection. Forward connections are expected to be the normal use case for STTP publisher/subscriber connections. However, for an STTP connection it does not matter which party, publisher or subscriber, is the initiator of the socket connection.

In STTP it is valid for a publisher to initiate a client-style socket connection to a subscriber that is listening with an established server-style socket. This type of connectivity model is called a reverse connection. Since a client-style connection is the only type of socket that can initiate a connection, a reverse connection requires the publisher to be the initiator of a connection such that the target subscriber would be able to receive data.

Reverse connections flip the normal responsibilities of a publish/subscribe messaging pattern by having parties that provision the data also be the be the initiators of a connection. Data subscribers, which might otherwise come and go as needed, now become a persistent network resource that needs to be readily available for a connection from its publisher. Reverse connections can require more data flow planning and network engineering to ensure that connections are initiated from the proper locations while having the data reliably flow to the desired locations. Often, a reverse connection is used to ensure connection is initiated from an environment of higher security to one of a lower security as is cyber security best practice. Regardless of how a connection is established, forward or reverse, the functions, roles and responsibilities of the participants may not change. For example, a publisher can still be the provider of data and the subscriber can still be the consumer of data. Additionally, any required protocol negotiations by the parties continues as normal once the connection has been established.

Increased flexibility in the connectivity models for STTP is beneficial so that security boundaries that have been enforced with firewall rules can be maintained. A common use case is that the publisher, and the data it is has access to, will exist in a secure network environment and the subscribers, which need access to the data, will exist in less secure network environments. In these scenarios, firewall rules will prohibit any connections from being initiated from an environment that is determined to be less secure. However, such environments normally allow connections to be initiated from inside the secure environment out to listening connections in less secure environments. Described more simply, nothing can reach into systems in the secure environment, but systems in the secure environment can reach out—this is much like how a computer in a home network can access the public Internet through a router, but the router's built-in firewall prevents systems on the Internet from accessing the home computer. Although reverse connections may initially seem counter-intuitive, they exist as a firm STTP requirement to allow for successful data exchange from within secure environments.

For data transmissions over the Internet or those that need to transmit sensitive data, a secured socket connection can be established for STTP communications. To secure a connection, a socket can be established with TLS using a signed X.509 certificate. TLS is used to encrypt, authenticate, and attest to the integrity of the data being transmitted over STTP.

The use of X.509 certificates can be used in order to secure an STTP connection using TLS. For STTP, certificates are used to verify a connection's identity and provide data encryption and integrity guarantees. For confidence in the certificates being used, STTP defines the operations needed to ensure that certificates are valid. STTP implementations can use self-signed certificates or those signed by a certificate authority (CA). For CA issued certificates, trust is delegated to the CA, which normally means the CA needs to be accessible during the validation process.

For self-signed certificates, trust exists between the two parties exchanging certificates, which means each party needs to agree to keep the certificates private and to notify the other party if the host machine is ever known to be compromised, i.e., where an external party may have been able to gain access to the private keys stored for the certificate. Since trust for self-signed certificates is between the two parties exchanging data, STTP requires that the certificates be exchanged in advance-a self-signed cert sent during TLS negotiations must be considered untrusted. Self-signed certificates should always be exchanged out-of-band, i.e., not over the STTP protocol, and should never include the private keys.

Certificate validation is handled in terms of the type of socket connection that is established, i.e., a client-style socket or a server-style socket. The STTP functional role of the party, i.e., publisher or subscriber, does not affect the certificate validation process because both client and server style connections can be set up to validate certificates. Consequently, a publisher can validate subscriber certificates and a subscriber can validate its publisher certificate regardless of which connectivity model is in use, forward or reverse.

Implementations disclosed herein recognize that the STTP protocol can be utilized for high-speed feedback control applications over the Internet in various functions in the power grid.

As anon-limiting example, assume "n" leaf controllers (one example of a child controller) being supervised by one parent controller positioned on a feeder head. Each leaf controller controls "n" number of inverters that inject power into a corresponding local microgrid network. The parent controller sends commands to leaf controllers and these leaf controllers send corresponding commands to corresponding controllable resource(s) such as solar, battery, and/or EV charger. The communications to these controllable devices can be via the STTP protocol. In addition to leaf microgrids, there can be other microgrids that supervise the leaf microgrids as well as virtual microgrids that are based on specific nodal locations in the network. These are called microgrid controllers or virtual microgrid controllers.

The controllers (parent and/or leaf) can optionally include 1×1 real power and 1×1 reactive power controllers, and 2×2 apparent power controllers (real and reactive power decoupled controllers, or real power and power factor controllers), depending on control design and objective.

As referenced above, a child microgrid can be a virtual microgrid that can be defined dynamically at selected "nodes" in the power grid. A virtual microgrid can be any point in a larger power grid that meets the DOE definition of a microgrid, e.g., a "single controllable entity" in the power grid. This means that all power flowing into or out of this point must be controllable.

In many cases, the parent controller is located remotely from (e.g., miles away from) the leaf controllers making communication of input data and control commands difficult and expensive. Prior techniques achieve communication between a server and a client using VPN data communication and conventional protocols such as Modbus or DNP3. Such prior control communication techniques have low bandwidth due to the protocol and serial data network design. This can be overcome for example by using a BSDH with STTP over the Internet or a private local area network. As described above, a BSDH utilizes one or more streaming data protocols for data transport and processes one or more data protocols. A BSDH provides data management and communications to its client, which is the parent controller or one of the leaf controllers with end device(s) connected. The functionalities of the parent and leaf BSDHs can be the same, but the BSDHSs can be configured differently at the leaf controllers and the parent controller.

In this non-limiting example, the BSDH at a leaf controller can be configured as a publisher of synchrophasor and analog messages and a subscriber of analog power setpoint data over the Internet. Locally, the BSDH communicates to the controllable end devices via Modbus TCP. The BSDH at the leaf controller uses the STTP protocol to process synchrophasor data to send to the parent controller (subscriber) over the Internet. Meanwhile, the BSDH at the leaf controller subscribes to analog power control setpoints from the parent controller. Once the analog power setpoint is received using the STTP, it is processed, re-formatted, and sent to the controlled devices over Modbus TCP. When the controllable device takes action for power control, the changes of power system parameters will be measured by a phasor measure unit (PMU), resulting in an updated synchrophasor message to be sent to the parent BSHD over the Internet.

In this non-limiting example, the BSDH at the parent controller is configured as a subscriber of the synchrophasor and analog messages (from leaf BSDHs) and a publisher of analog power setpoint data over the Internet. Locally, the BSDH communicates to the parent controller directly using TCP/IP or an application programming interface (API). The BSDH receives the synchrophasor data packets from leaf BSHDs, processes them, re-assembles them a complete synchrophasor message, and sends the synchrophasor message to the parent controller for further analysis and action. Other analog messages are processed similarly and sent to the parent controller. Next, the parent controller determines and passes the power control setpoints to its BSDH for processing and publishing over the Internet. This continuous receiving of power system parameters obtained from synchrophasor and/or analog messages processed at the parent controller and sending of analog power setpoint data from the parent to the leaf controller provides feedback control of controllable end devices.

Turning now to the Figures, FIG. 1 schematically depicts an example BSDH 120 and an example environment in which the BSDH 120 can be implemented. In FIG. 1, the BSDH 120 includes a communications and security module 122 and a sending and receiving module 124.

The communications and security module 122 is in communication with a public communication network 108, such as the Internet, and receives and/or transmits data, via the public communication network 108, that is in accordance with a communications protocol such as STTP described herein. The communications and security module 122 can handle communications received at and/or transmitted from the BSDH 120. For example, it can identify the sender and receiver of a received data packet, the specific data message format of the received data packet, the specific streaming data protocol of the received data packet, and handle the data security.

The communications and security module 122 is also in communication with one or both of a controller 110 (e.g., a parent or child controller) and/or with sensor(s) 115 and/or controllable resource(s) 114. The communication with the controller 110, the sensor(s) 115, and/or the controllable resource(s) 114 can optionally be via the public communication network 108 in some implementations. In some implementations, the communication with the controller 110, the sensor(s) 115, and/or the controllable resource(s) 114 can be via a LAN and/or an API. For example, the communication between the BSDH and the controller 110 can be via a LAN and/or an API. The sensor(s) 115 and/or the controllable resource(s) 114 can optionally be part of a power grid 101. For example, the sensor(s) 115 can include a sensor at a point of interconnection (POI) of the power grid 101, such as a protective relay that is connected to current and voltage transformers or a phasor measure unit (PMU).

The controllable resource(s) 114 can include one or more controllable generators, one or more controllable batteries 114A, and/or one or more real or virtual microgrids 118A. The controllable resource(s) 114A are automatically controllable and one or more can optionally be measured. For example, the controllable resource(s) 114A can include an EV charging system, a thermostat, and/or other controllable resource(s). As another example, the controllable resource (s) 114A can include controllable battery/batteries that are controllable and optionally measured, and that can selectively both pull power from the power grid 101 and provide power to the power grid 101. As another example, the controllable resource(s) 114A can include controllable generator(s) 112A are controllable and measured, and that can at least selectively provide power to the power grid 101. Whether and/or how the controllable generator(s) provide power to the power grid 101 can be controlled. As another example, the controllable resource(s) 114A can include real and/or virtual microgrid(s) that can be controlled and measured, and that can each include corresponding electrical resource(s) that are topologically behind the corresponding microgrid. A microgrid can pull power from the power grid 101 and can optionally (depending on its corresponding electrical resource(s)) provide power to the power grid 101.

It is noted that in some implementations where the BSDH 120 is implemented in conjunction with a controller 110 that is a parent controller, the BSDH may not be in direct communication with the sensor(s) 115 and/or controllable resource(s) 114. Rather, in some of those implementations the BSDH is in communication with additional BSDH(s) 120 that, in turn, are in direct communication with the sensor(s) 115 and/or controllable resource(s) 114. It is also noted that in implementations where the BSDH is implemented in conjunction with a controller 110 that is a child controller, the child controller itself can be a feedback controller or can be a non-feedback controller that directly controls one or more of the controllable resource(s) 114.

The sending and receiving module 124 processes incoming data packets from the public communication network 108 into complete messages and processes outbound complete messages into outbound data packets for transmitting over the public communication network 108. The sending and receiving module 124 can use a streaming protocol 125A to ensure inbound data packets are processed according to the identified streaming data protocol and/or to ensure outbound data packets are configured according to the identified streaming data protocol. The sending and receiving module 124 can optionally additionally use data formats 125B to ensure inbound data packets are processed according to a specific data message format and/or to ensure outbound data packets are configured according to the data formats 125B. For example, a header of related incoming data packets can directly or indirectly indicate the data format for the data packets, and a corresponding one of the data formats 125B utilized in generating a complete message from the data packets. For instance, the same header of multiple data packets can indicate a Modbus data format (e.g., indicate it directly or indicate a corresponding device that utilized Modbus) and, as a result, the sending and receiving module 124 can utilize a Modbus data format, of the data formats 125B, in generating a complete message from the multiple data packets. Also, for instance, a different same header of different multiple data packets can indicate a DNP3 data format (e.g., indicate it directly or indicate a corresponding device that utilized DNP3) and, as a result, the sending and receiving module 124 can utilize a DNP3 data format, of the data formats 125B, in generating a complete message from the different multiple data packets. Likewise, in generating outbound data packets for a complete message, the sending and receiving module 124 can generate the outbound data packets in accordance with the data format for the complete message and optionally directly or indirectly indicate, in a header of each of the generated outbound data packets, the data format.

Moreover, and as described herein, for an inbound data packet that includes a synchronized timestamp, the sending and receiving module 124 can generate a complete inbound message that also includes the synchronized timestamp. Likewise, for an outbound complete message that includes a synchronized timestamp, the sending and receiving module 124 can generate corresponding outbound data packets that each also include the synchronized timestamp.

Figure 2:
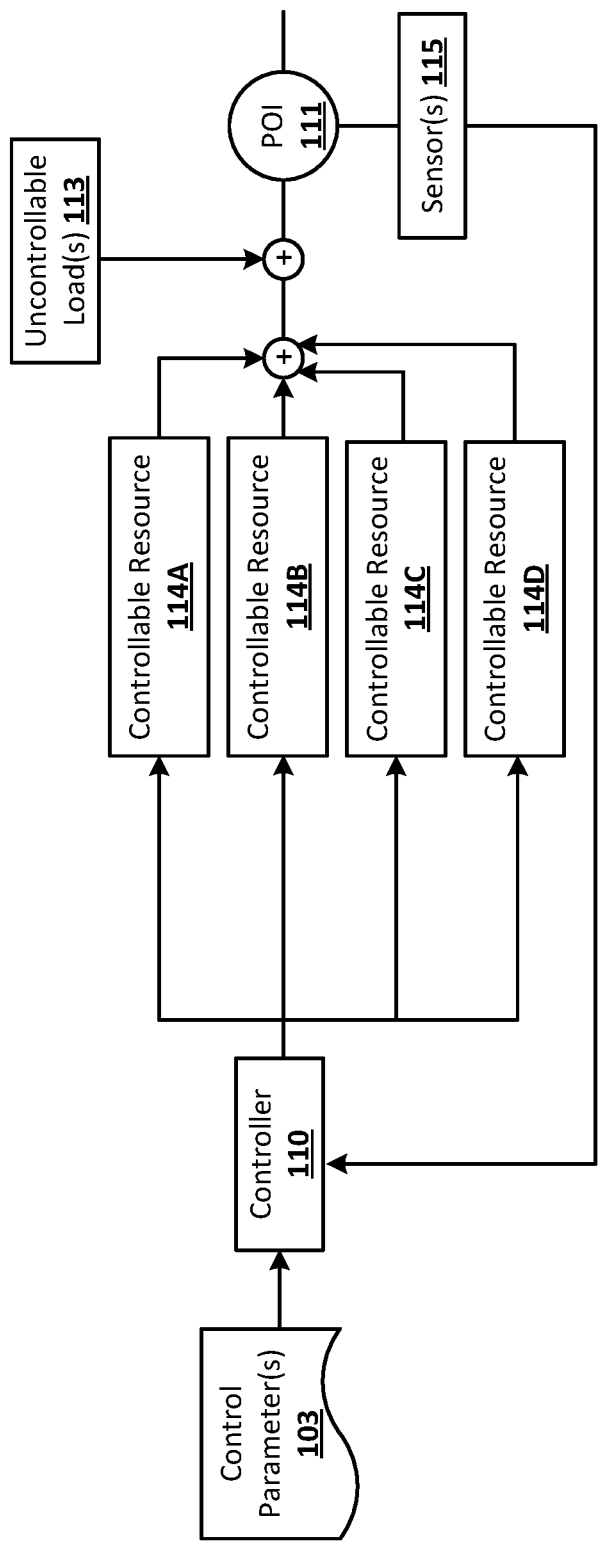
FIG. 2 schematically depicts an example feedback control loop of a feedback controller of a power grid.

FIG. 2 schematically depicts an example feedback control loop of a feedback controller of a power grid. In FIG. 2 a controller 110 can optionally receive control parameter(s) 103 from an upstream controller in a hierarchical control configuration. As described herein, the control parameter(s) 103 can optionally be provided to the controller 110 by a BSHD associated with the controller 110. For example, the BSHD can receive, over a public communication network, multiple data packets transmitted, by an upstream BSHD associated with the upstream controller, according to a data transmission protocol. Further, the BSHD can assemble the received data packets into a complete message that reflects the control parameter(s) 103. The received data packets can each include a synchronized timestamp that is for a measurement time of a measurement on which the control parameter(s) 103 is based. The complete message can likewise include the synchronized timestamp based on it being assembled based on the received data packets that each include the synchronized timestamp.

The controller 110 can also receive sensor data from real or virtual sensor(s) 115 that measure or estimate one or more power values (e.g., power flow measurement(s)) at a corresponding real or virtual point of intersection (POI) 111. For example, the sensor data can include time-synchronized synchrophasor data and/or analog data. The sensor data can be sent with a synchronized timestamp that corresponds to a measurement time of the sensor data. As described herein, the sensor data can optionally be provided to the controller 110 by a BSHD associated with the controller 110. For example, the BSHD can receive, over a public communication network, multiple data packets transmitted, by a BSHD associated with the sensor(s) 115, according to a data transmission protocol. Further, the BSHD can assemble the received data packets into a complete message that reflects the sensor data and that reflects the synchronized timestamp that corresponds to the measurement time of the sensor data and that is included in each of the received data packets. It is noted that the BSHD associated with the sensor(s) 115 can communicate unidirectional only (i.e., provide data packets to the controller 110 without receiving any data packets from the controller 110).

The controller 110 uses the sensor data and the optional control parameter(s) 103 to generate control output that is provided to one or more of the controllable resources 114A-D. Each of the controllable resources 114A-D can be a controllable resource such as a BESS, a PV array, a generator, etc. —and/or can be a separate microgrid (optionally with its own feedback controller(s)). In some implementations, the control output is allocated (e.g., equally or unequally based on one or more criteria) amongst the controllable resources 114A-D. The control output causes corresponding changes at the controllable resource(s) 114A-D, thereby impacting power flow and/or other properties of the power grid. As described herein, the control output can be provided by the controller to a BSHD associated with the controller 110, and the BSHD can generate, according to a streaming protocol, outbound streaming data packets that correspond to the control output. Further, the BSHD can transmit the outbound streaming data packets over a public communication network to corresponding BSHD(s) associated with the controllable resources, which can assemble received data packets into corresponding complete message(s) for control of the controllable resources 114A-D.

The overall process illustrated by FIG. 2 can be repeated at a high frequency (e.g., multiple times per second) to enable fast feedback control of the power grid. Further, the utilization of BSHD(s) in the overall process illustrated by FIG. 2 can enable such high frequency control without necessitating any VPNs and/or LANs be utilized. Yet further, the utilization of synchronized timestamps, that correspond to measurement times, can ensure appropriate and stable control of the power grid.

Figure 3:
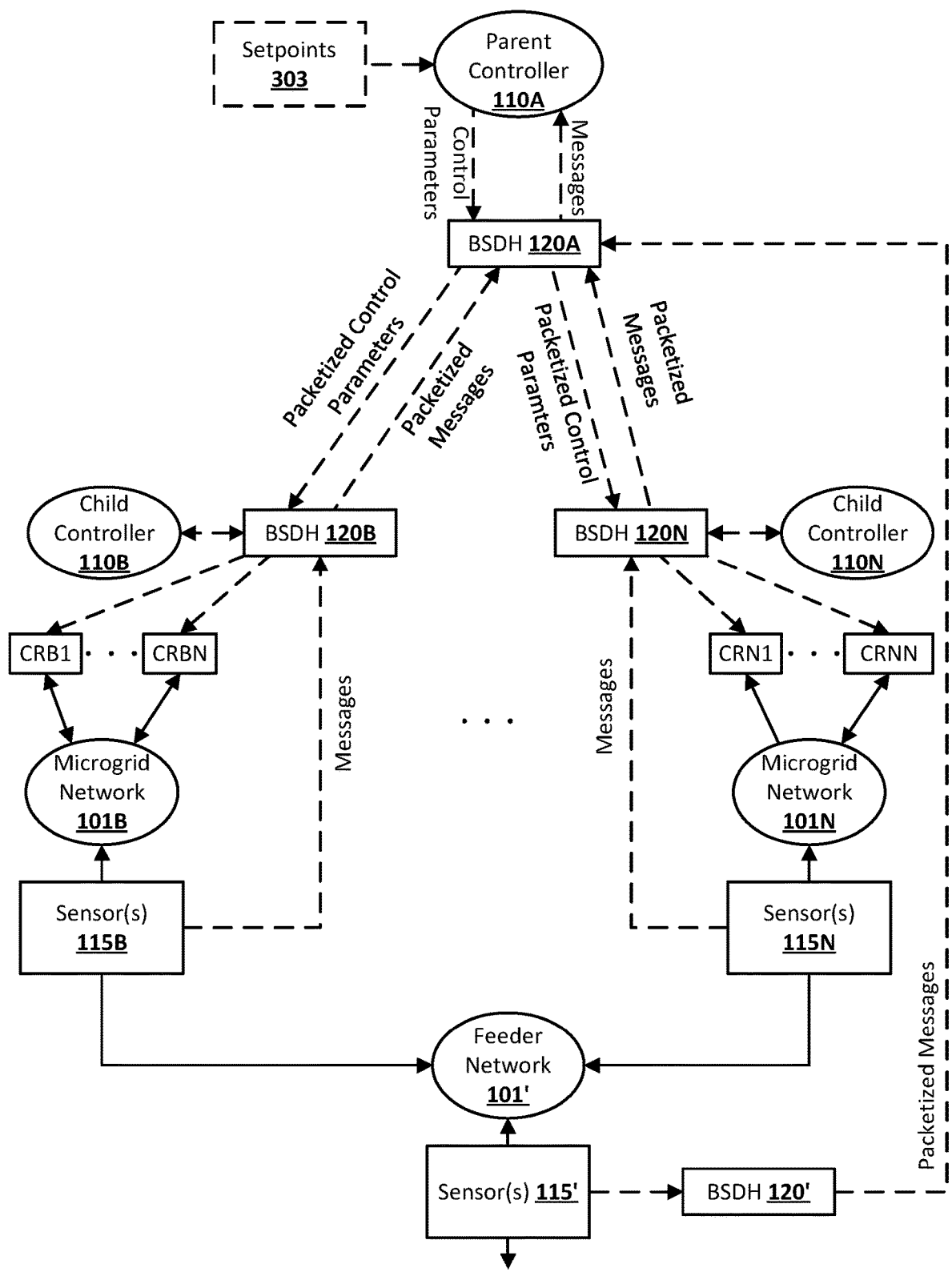
FIG. 3 schematically depicts an example fast control system that includes a parent controller, multiple child controllers, and BSDHs utilized in bidirectional communications between the parent controller and the child controllers.

FIG. 3 schematically depicts an example fast feedback control system that includes a parent controller 110A and an associated parent BSDH 120A. The fast feedback control system further includes child controller 110B and associated BSDH 120B and child controller 110N and 120N. The horizontal ellipsis in FIG. 3 indicates that additional child controller(s) (and associated components such as BSDH(s)) could be provided in the fast feedback control system. Dashed lines between components in FIG. 3 indicate communication pathways, one or more of which can be over a public communication network as described herein. Solid lines indicate power grid interconnections between components.

In FIG. 3, the fast feedback control system is integrated with a power grid that includes a feeder network 101' that at least selectively feeds power to, and can optionally at least selectively receive power from, microgrid network 101B, microgrid network 101N, and any additional microgrid network(s) represented by the ellipsis in FIG. 3.

In FIG. 3, BSDH 120B works in conjunction with child controller 110B to at least selectively control controllable resources of microgrid network 101B, such as CRB1 and CRBN. The BSDH 120B can receive complete messages from sensor(s) 115B that are at a POI of the microgrid network 101B. The BSDH 120B can process the messages, according to a streaming data protocol and optionally a data format, to generate packetized messages, and transmit the packetized messages over a public communication network to BSDH 120A. Further, the BSDH 120B can receive packetized control parameters from BSDH 120A, assemble the packetized control parameters into complete messages with control parameters, and provide the control parameters to child controller 110B. Child controller 110B can utilize the control parameters, optionally along with corresponding synchronized timestamps and/or other data, to determine control command(s) to provide to one or more of the controllable resources of microgrid network 101B, such as CRB1 and CRBN. In some implementations, the child controller 110B can cause the BSDH 120B to transmit those control commands to the controllable resource(s), optionally over a public communication network and in a packetized manner as described herein. In some other implementations, the child controller 110B can directly transmit those control commands to the controllable resources.

In FIG. 3, BSDH 120N works in conjunction with child controller 110N to at least selectively control controllable resources of microgrid network 101N, such as CRN1 and CRNN. The BSDH 120N can receive complete messages from sensor(s) 115N that are at a POI of the microgrid network 101N. The BSDH 120N can process the complete messages, according to a streaming data protocol and optionally a data format, to generate packetized messages, and transmit the packetized messages over a public communication network to BSDH 120A. Further, the BSDH 120N can receive packetized control parameters from BSDH 120A, assemble the packetized control parameters into complete messages with control parameters, and provide the control parameters to child controller 110N. Child controller 110N can utilize the control parameters, optionally along with synchronized timestamp(s) and/or other data, to determine control command(s) to provide to one or more of the controllable resources of microgrid network 101N, such as CRN1 and CRNN. In some implementations, the child controller 110N can cause the BSDH 120N to transmit those control commands to the controllable resource(s), optionally over a public communication network and in a packetized manner as described herein. In some other implementations, the child controller 110N can directly transmit those control commands to the controllable resources.

In FIG. 3, BSDH 120' receives complete messages from sensor(s) 115' that are at a POI of the feeder network 101'. The BSDH 120' can process the messages, according to a streaming data protocol and optionally a data format, to generate packetized messages, and transmit the packetized messages over a public communication network to BSDH 120A.

In FIG. 3, BSDH 120A works in conjunction with parent controller 110A to obtain sensor data and/or other data related to the power grid and to communicate control parameters and/or other output data to child controllers 110B-N. The BSDH 120A can receive packetized messages from child BSDHs such as 120B, 120N, and/or 120' and can process the packetized messages, according to a streaming data protocol and optionally a corresponding data format, to generate corresponding complete messages, that optionally each include a synchronized timestamp that is included in each of the packetized messages, and provide the corresponding complete messages to parent controller 110A. The parent controller 110A can utilize the complete messages (including synchronized timestamps thereof) and optionally setpoints 303 and/or other data, in determining control parameters for maintaining desired power flow, stability and/or other characteristics of the power grid. Optional setpoints 303 can be provided by one or more higher level controllers in a hierarchical arrangement, and can optionally be provided to parent controller via BSDH 120A in a packetized manner and via a public communication network.

The BSDH 120A can process the control parameters, generated by parent controller 110A, according to a streaming data protocol and optionally a data format, to generate packetized control parameters, and transmit the packetized control parameters over a public communication network to BSDHs 120A and 120N. Each of the control parameters can also be associated with a synchronized timestamp, that corresponds to a measurement time of sensor data on which the control parameter is based, and the synchronized timestamp can be included in each of the packetized control parameters. This general process illustrated in FIG. 3 can be performed continuously and at a high rate (e.g., >30 Hz) to enable fast feedback control of the power grid of FIG. 3.

Figure 4:
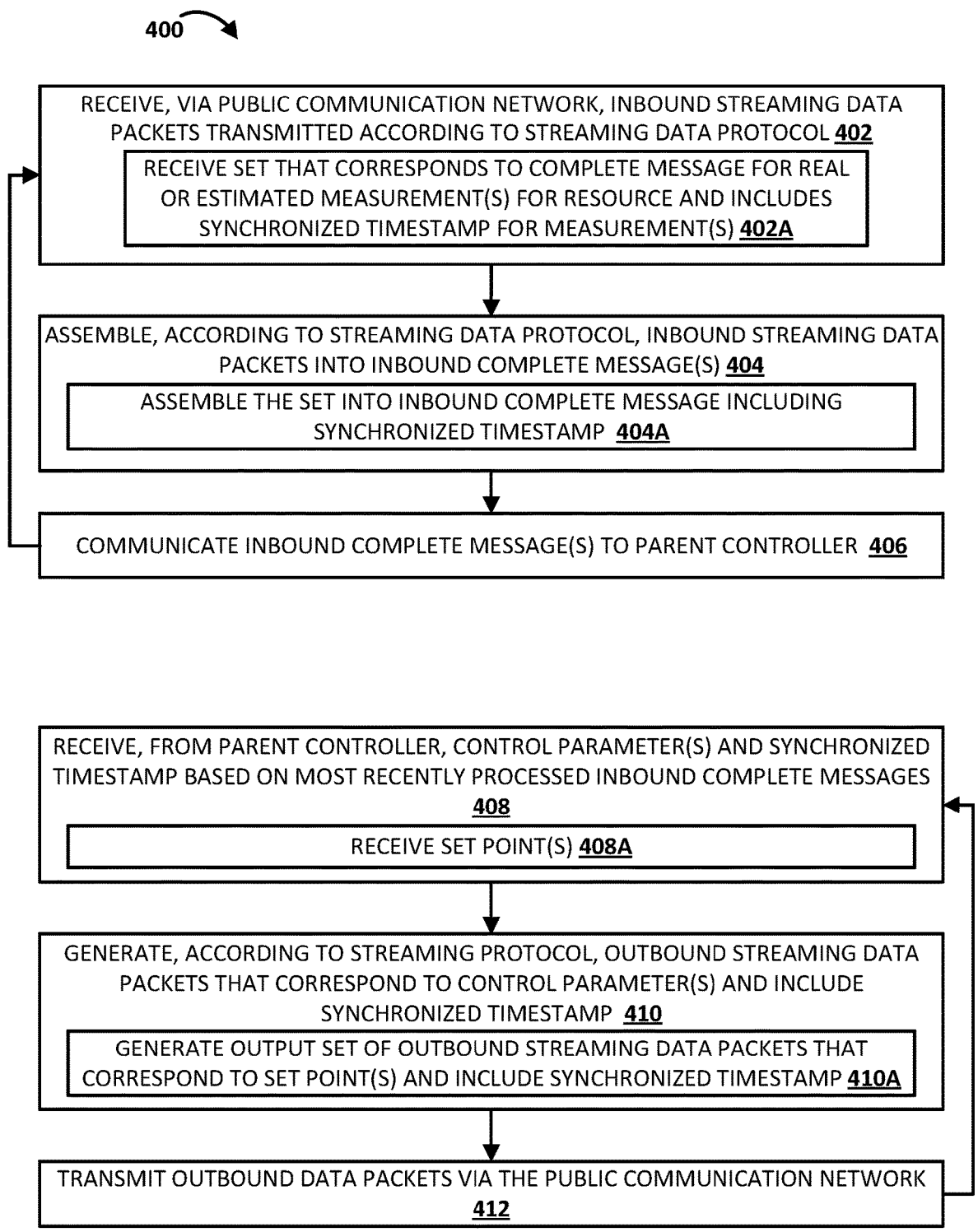
FIG. 4 illustrates an example method of utilizing a BSDH in bidirectional communications in conjunction with a parent controller of a power grid.

FIG. 4 is a flowchart illustrating an example method 400 of utilizing a BSDH in bidirectional communications in conjunction with a parent controller of a power grid. For convenience, the operations of the flow chart are described with reference to a system that performs the operations. This system can include various components of various computer systems, such as one or more processor(s) implementing a BSDH described herein. Moreover, while operations of method 400 are shown in a particular order, this is not meant to be limiting. One or more operations can be reordered, omitted, or added.

In method 400, blocks 402, 404, and 406 are illustrated as separate from blocks 408, 410, and 412. It is noted that in various implementations iterations of blocks 402, 404, and 406 can occur in parallel with iterations of blocks 408, 410, and 412. For example, the processing of inbound data of blocks 402, 404, and 406 can continuously occur at a frequency (e.g., >1 Hz) while the processing of blocks 408, 410, and 412 can also continuously occur, optionally at the same frequency.

At block 402, the system receives, via a public communication network, inbound streaming data packets transmitted according to a streaming data protocol. In some implementations, block 402 includes sub-block 402A, in which the system receives a set of inbound streaming data packets that corresponds to a complete message for real or estimated measurement(s) for a resource and that includes a synchronized timestamp (e.g., GPS synchronized) that reflects a time of the measurement(s). For example, the complete message can be a real or estimated sensor measurement, such as a measurement from a real PMU at a POI of a power grid. Continuing with the example, the synchronized timestamp can be a time of the sensor measurement and can be included in the complete message and also included in the set of inbound streaming data packets. The synchronized timestamp can be included in the set of inbound streaming data packets as a result of being included in the complete message.

At block 404, the system assembles, according to a streaming data protocol and optionally a data format, inbound streaming data packets received at block 402 into inbound complete message(s). In some implementations, block 404 includes sub-block 404A in which the system assembles the set, optionally received in block 402A, into an inbound complete message that includes the synchronized timestamp that is included in each of the inbound complete messages.

At block 406, the system communicates the inbound complete message(s), from block 404, to a parent controller. The parent controller can utilize the inbound complete message(s) in generating updated control parameter(s) that are received in block 408 (described below). The system then proceeds back to block 402 to receive additional inbound streaming data packets. Iterations of blocks 402, 404, and 406 can occur continuously and at a high frequency (e.g., >30 Hz) to enable providing, to the parent controller, a continuous and low-latency stream of inbound sensor data and/or other complete message(s).

At block 408, the system receives, from the parent controller, control parameter(s) and a synchronized timestamp that are based on inbound complete message(s) that have been most recently processed by the parent controller. The synchronized timestamp that is included in an iteration of block 408 is the same as the synchronized timestamp of inbound complete message(s) that have been most recently processed by the parent controller. In some implementations, block 408 includes sub-block 408A, in which the system receives set point(s) as all or some of the control parameter(s).

At block 410, the system generates, according to a streaming protocol and optionally according to a data format, outbound streaming data packets that correspond to the control parameter(s) of block 408 and that include the synchronized timestamp of block 408. In some implementations, block 410 includes sub-block 410A, in which the system generates an output set of outbound streaming data packets that correspond to the set point(s) of optional sub-block 408A and that include the synchronized timestamp of block 408.

At block 412, the system transmits the outbound data packets, from block 410, via the public communication network.

The system then proceeds back to block 408 to receive additional control parameter(s) and an additional synchronized timestamp. Iterations of blocks 408, 410, and 412 can occur continuously and at a high frequency (e.g., >30 Hz) to enable transmitting, to child controller(s) and/or controllable device(s), a continuous and low-latency stream of control parameter(s) and corresponding synchronized timestamps.

Figure 5:
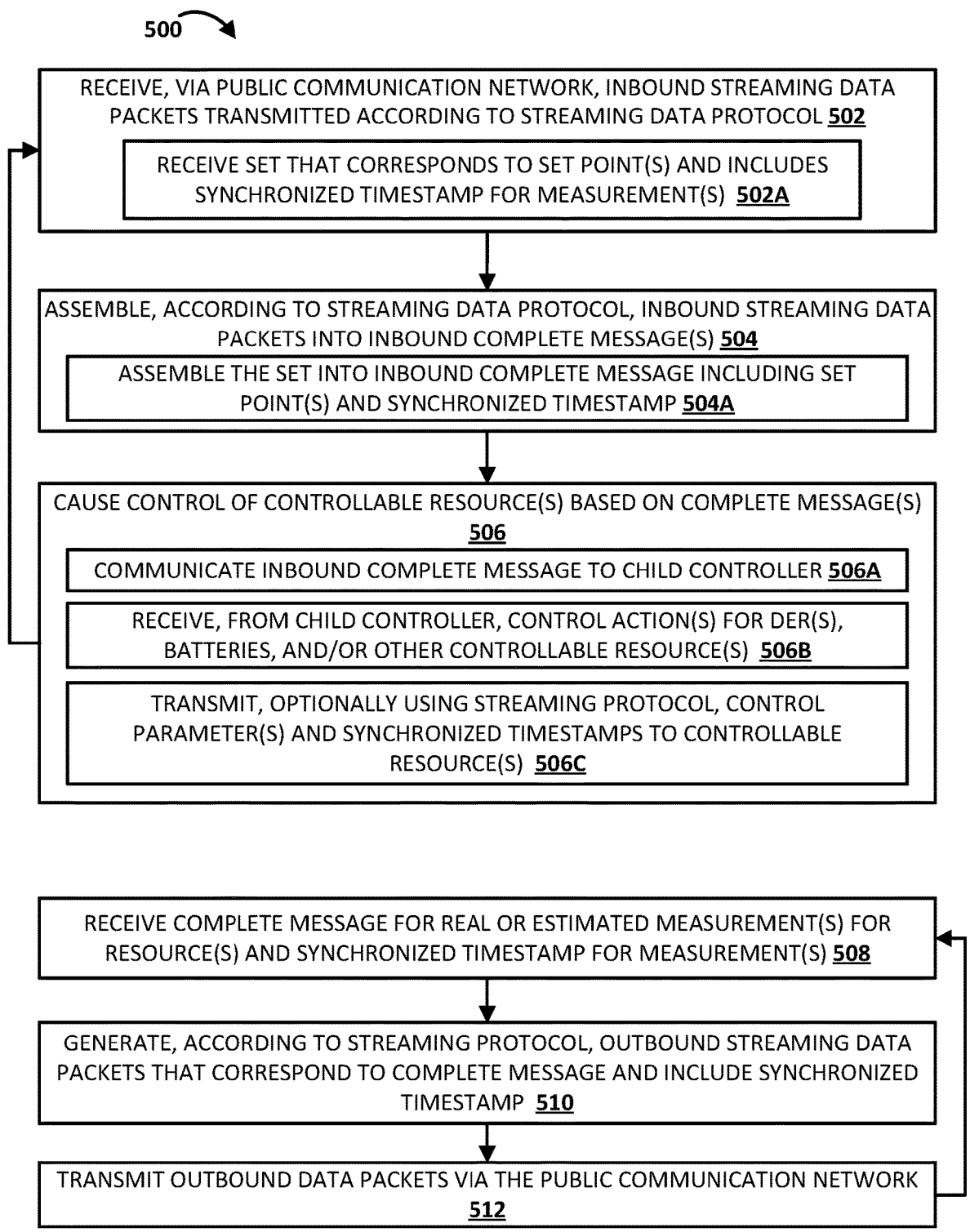
FIG. 5 illustrates an example method of utilizing a BSDH in bidirectional communications in conjunction with a child controller of a power grid.

FIG. 5 is a flowchart illustrating an example method 500 of utilizing a BSDH in bidirectional communications in conjunction with a child controller of a power grid. For convenience, the operations of the flow chart are described with reference to a system that performs the operations. This system can include various components of various computer systems, such as one or more processor(s) implementing a BSDH described herein. Moreover, while operations of method 500 are shown in a particular order, this is not meant to be limiting. One or more operations can be reordered, omitted, or added.

In method 500, blocks 502, 504, and 506 are illustrated as separate from blocks 508, 510, and 512. It is noted that in various implementations iterations of blocks 502, 504, and 506 can occur in parallel with iterations of blocks 508, 510, and 512. For example, the processing of inbound data of blocks 502, 504, and 506 can continuously occur at a frequency (e.g., >1 Hz) while the processing of blocks 508, 510, and 512 can also continuously occur, optionally at the same frequency.

At block 502, the system receives, via a public communication network, inbound streaming data packets transmitted according to a streaming data protocol. These inbound streaming data packets can be data packets transmitted at block 412 of method 400 (FIG. 4) and can correspond to output command(s) from a parent controller. In some implementations, block 502 includes sub-block 502A, in which the system receives a set of inbound streaming data packets that corresponds to set point(s) and includes a synchronized timestamp for measurement(s) on which the set point(s) are based.

At block 504, the system assembles, according to a streaming data protocol and optionally a data format, inbound streaming data packets received at block 502 into inbound complete message(s). In some implementations, block 504 includes sub-block 504A in which the system assembles the set, optionally received in block 502A, into an inbound complete message that includes the set point(s) and the synchronized timestamp.

At block 506, the system causes control of controllable resource(s) based on the complete message(s) of block 504. Such controllable resource(s) can include, for example, one or more batteries, one or more generators, DER device(s), and/or other resource(s). In some implementations, in causing control of the controllable resources based on the complete message(s) of block 504, the system performs one or more of sub-blocks 506A, 506B, and 506C.

At sub-block 506A, the system communicates the inbound complete message to a child controller. At sub-block 506B, the system receives, from the child controller, control action(s) for DER(s), battery/batteries, and/or other controllable resource(s) such as microgrid(s) and/or PV array(s). The control action(s) can be generated by the child controller based on the inbound complete message and optionally other data (e.g., current state(s) of controllable resource(s)). For example, the complete message can indicate a set point and a synchronized timestamp and multiple control actions can be received at block 506B which, collectively when implemented, achieve the set point. At sub-block 506C, the system transmits, optionally using a streaming protocol, the control action(s) to the controllable resource(s).

The system then proceeds back to block 502 to receive additional inbound streaming data packets. Iterations of blocks 502, 504, and 506 can occur continuously and at a high frequency (e.g., >30 Hz) to enable providing, to the parent controller, a continuous and low-latency stream of inbound sensor data and/or other complete message(s).

At block 508, the system receives a complete message for real or estimated measurement(s) for resource(s) and a synchronized timestamp for the measurement(s) (i.e., that reflects a time at which the measurement(s) were taken). For example, the complete message can be received from a sensor at a POI, can be received from a controllable resource, and/or can be an estimated measurement for a POI.

At block 510, the system generates, according to a streaming protocol and optionally according to a data format, outbound streaming data packets that correspond to the complete message of block 510 and that each include the synchronized timestamp of block 510. For example, the system can generate outbound streaming data packets based on a streaming protocol and based on a data format that is specific to the type of complete message, optionally along with a header that directly or indirectly identifies the data format.

At block 512, the system transmits the outbound data packets, from block 510, via the public communication network. Such outbound data packets can be included among those received at block 402 of method 400 (FIG. 4).

The system then proceeds back to block 508 to receive an additional complete message. Iterations of blocks 508, 510, and 512 can occur continuously and at a high frequency (e.g., >30 Hz) to enable transmitting, to parent controller(s), a continuous and low-latency stream of complete messages.

Figure 6:
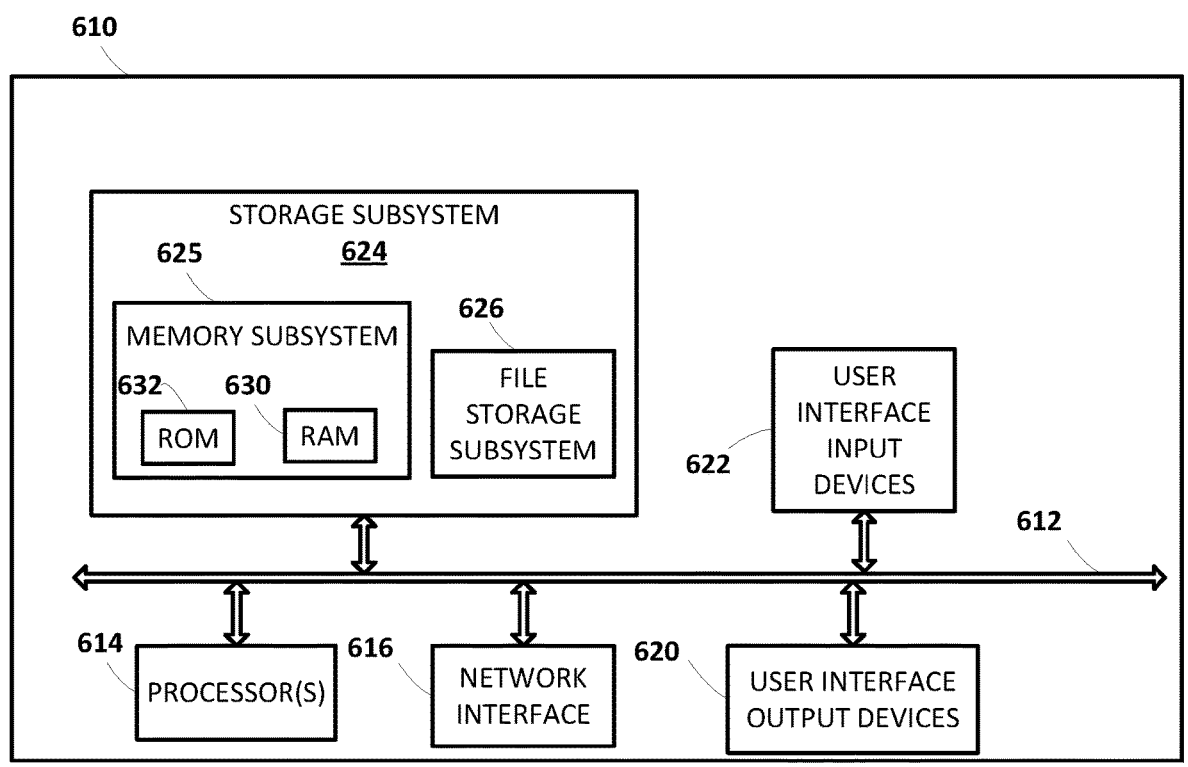
FIG. 6 schematically illustrates an example computer architecture on which selected aspects of the present disclosure can be implemented.

FIG. 6 is a block diagram of an example computing device 610 that can optionally be utilized to perform one or more aspects of techniques described herein. For example, all or aspects of computing device 610 can be incorporated in server(s) or other computing device(s) that are utilized to implement a virtual microgrid controller.

Computing device 610 typically includes at least one processor 614 which communicates with a number of peripheral devices via bus subsystem 612. These peripheral devices can include a storage subsystem 624, including, for example, a memory subsystem 625 and a file storage subsystem 626, user interface output devices 620, user interface input devices 622, and a network interface subsystem 616. The input and output devices allow user interaction with computing device 610. Network interface subsystem 616 provides an interface to outside networks and is coupled to corresponding interface devices in other computing devices.

User interface input devices 622 can include a keyboard, pointing devices such as a mouse, trackball, touchpad, or graphics tablet, a scanner, a touch screen incorporated into the display, audio input devices such as voice recognition systems, microphones, and/or other types of input devices. In general, use of the term "input device" is intended to include all possible types of devices and ways to input information into computing device 610 or onto a communication network.

User interface output devices 620 can include a display subsystem, a printer, a fax machine, or non-visual displays such as audio output devices. The display subsystem can include a cathode ray tube (CRT), a flat-panel device such as a liquid crystal display (LCD), a projection device, or some other mechanism for creating a visible image. The display subsystem can also provide non-visual display such as via audio output devices. In general, use of the term "output device" is intended to include all possible types of devices and ways to output information from computing device 610 to the user or to another machine or computing device.

Storage subsystem 624 stores programming and data constructs that provide the functionality of some or all of the modules described herein. For example, the storage subsystem 624 can include the logic to perform selected aspects of the methods of FIGS. 4 and/or 5, as well as to implement various components depicted in the Figures.

These software modules are generally executed by processor 614 alone or in combination with other processors. Memory 625 used in the storage subsystem 624 can include a number of memories including a main random-access memory (RAM) 630 for storage of instructions and data during program execution and a read only memory (ROM) 632 in which fixed instructions are stored. A file storage subsystem 626 can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem 626 in the storage subsystem 624, or in other machines accessible by the processor(s) 614.

Bus subsystem 612 provides a mechanism for letting the various components and subsystems of computing device 610 communicate with each other as intended. Although bus subsystem 612 is shown schematically as a single bus, alternative implementations of the bus subsystem can use multiple busses.

Computing device 610 can be of varying types including a workstation, server, computing cluster, blade server, server farm, or any other data processing system or computing device. Due to the ever-changing nature of computers and networks, the description of computing device 610 depicted in FIG. 6 is intended only as a specific example for purposes of illustrating some implementations. Many other configurations of computing device 610 are possible having more or fewer components than the computing device depicted in FIG. 6.

While several implementations have been described and illustrated herein, a variety of other means and/or structures for performing the function and/or obtaining the results and/or one or more of the advantages described herein can be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations can be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

In some implementations a secured method for high-speed real-time feedback control in an electric power system is provided where a control system monitors and controls energy resource clients by utilizing synchronized data processed by bi-directional streaming data handlers through a public communication network for feedback control. In some of those implementations, the bi-directional streaming data handler functions as both publisher and subscriber, processes one or more messages of specific data format using one or more streaming data protocols, and communicates the full messages to its clients. In some additional or alternative of those implementations, the method further includes two or more levels of feedback controllers where multi-level closed-loop control is coordinated. In some additional or alternative of those implementations, synchrophasor data is used as the input data stream for the streaming protocol to breakdown into a set of data parts to be transmitted from the sending end through a public data network. In some additional or alternative of those implementations, IEEE 2664 will be used as one of the streaming protocols to break down the synchrophasor and analog data into parts. In some of those additional or alternative implementations IEEE 2664 is used as one of the streaming protocols to re-assemble the synchrophasor and analog data parts into full messages and/or a controller ingests the data parts directly from a bi-directional streaming data handler for real-time feedback control applications without the full message of C37.118. In some additional or alternative of those implementations, the streaming data in the bi-direction streaming data handler is conditioned in memory as is available to other data consumers and applications. In some additional or alternative of those implementations, the high-speed feedback controls occur at sub-second intervals continuously as fast as the data rate of the synchronized data, such as at up to 120 times per second (120 Hz).

In some implementations, a method implemented by processor(s) is provided and includes receiving an assembled inbound complete message that characterizes a measurement from a resource of an electrical power grid and that includes a synchronized timestamp of the measurement. The assembled inbound complete message is assembled, according to a streaming data protocol, from inbound streaming data packets that are transmitted via a public communication network responsive to the measurement from the resource. The assembled inbound complete message includes the synchronized timestamp of the measurement in response to the inbound streaming data packets each also including the synchronized timestamp. The method further includes communicating the assembled inbound complete message to a controller and receiving, from the controller, one or more control parameters that are generated by the controller based on the assembled inbound complete message. The method further includes generating an outbound complete message that includes the one or more control parameters and that includes the synchronized timestamp of the measurement. Generating the outbound complete message includes including the synchronized timestamp of the measurement, in the outbound complete message, based on the one or more control parameters being generated based on the assembled inbound complete message. The method further includes causing the outbound complete message to be transmitted, via the public communication network and according to the streaming protocol, as one or more outbound streaming data packets that each include the synchronized timestamp of the measurement. Transmission of the one or more outbound streaming data packets causes adjustment, of the electrical resource and/or of one or more additional electrical resources of the electrical power grid, in accordance with the one or more control parameters.

These and other implementations of the technology disclosed herein can include one or more of the following features.

In some implementations, the synchronized timestamp is synchronized to a Global Positioning System (GPS) clock. In some versions of those implementations, the inbound streaming data packets are transmitted, according to the streaming protocol, in response to generation of a complete message that includes the measurement and the synchronized timestamp of the measurement. In some of those versions, the complete message is generated by the resource responsive to taking the measurement at a time of the synchronized timestamp In some implementations, the method further includes: receiving an additional assembled inbound complete message that characterizes an additional measurement from the resource and that includes an additional synchronized timestamp of the additional measurement; communicating the additional assembled inbound complete message to the controller; receiving, from the controller, one or more additional control parameters that are generated by the controller based at least in part on the additional assembled inbound complete message; generating an additional outbound complete message that includes the one or more additional control parameters and that includes the additional synchronized timestamp of the additional measurement; and causing the additional outbound complete message to be transmitted, via the public communication network and according to the streaming protocol, as one or more additional outbound streaming data packets that each include the additional synchronized timestamp of the additional measurement. The additional synchronized timestamp is within one second of the synchronized timestamp. The additional assembled inbound complete message is assembled, according to the streaming data protocol, from additional inbound streaming data packets that are transmitted over a public communication network responsive to the additional measurement from the resource. The additional assembled inbound complete message includes the additional synchronized timestamp of the measurement in response to the additional inbound streaming data packets each also including the additional synchronized timestamp. Transmission of the one or more additional outbound streaming data packets causes adjustment, of the electrical resource and/or of one or more additional electrical resources of the electrical power grid, in accordance with the one or more additional control parameters. In some versions of those implementations, the additional synchronized timestamp is within one thirtieth of a second of the synchronized timestamp. In some of those versions, transmission of the one or more additional outbound streaming data packets occurs within one thirtieth of a second of transmission of the one or more outbound streaming data packets.

In some implementations, transmission of the outbound streaming data packets occurs within one second of receiving the inbound complete message.

In some implementations, the inbound complete message is a synchrophasor message and the inbound streaming data packets each include a given header and a corresponding segment of the synchrophasor message.

In some implementations, the inbound data packets are assembled into the inbound complete message based on identification, based on the inbound data packets, of a data message format and use of the identified data message format in assembling the inbound data packets into the inbound complete message.

In some implementations, the controller is a parent controller wherein the one or more outbound streaming data packets are transmitted via the public communication network to a bidirectional streaming data handler (BSDH) of a child controller. In those implementations, the one or more certain resources, that include one or more of the additional electrical resources and/or that include the resource, are controlled by the child controller. In some versions of those implementations, the BSDH of the child controller receives the one or more outbound streaming data packets, assembles the received outbound streaming data packets according to the streaming data protocol, and causes sending, to the certain resources that are topologically behind the child controller, of corresponding of one or more of the control parameters based on the assembly of the received outbound streaming data packets. In some additional or alternative versions of those implementations, the resource is included in the certain resources that are controlled by the child controller and the BSDH of the child controller received a complete inbound message from the electrical resource, generated the inbound data packets based on the complete inbound message according to the streaming protocol, and transmitted the inbound data packets via the public communication network. In some additional or alternative versions of those implementations, the one or more outbound streaming data packets are further transmitted via the public communication network to an additional BSDH of an additional child controller.

In some implementations, the one or more control parameters include set point data such as a power setpoint, a voltage setpoint, a frequency setpoint, and/or an angle setpoint.

In some implementations, the one or more control parameters include a real and reactive power, and voltage and frequency dispatch signal that is for a generator of the certain resources or is for a grid-following inverter of the certain resources.

In some implementations, the public communication network is the Internet and is not a virtual private network.

In some implementations, the resource is a real or virtual sensor, where transmission of the one or more outbound streaming data packets via the public communication network causes adjustment of one or more of the additional electrical resources, including: a real microgrid, a virtual microgrid, a battery, an energy storage unit, a generator, a solar power plant, a wind power plant, an electric vehicle charging system, an air conditioning unit, a washer, a dryer, a refrigerator, and/or a pool pump.

In some implementations, a method implemented by processor(s) is provided and includes generating a complete message that includes one or more measurements for one or more electrical resources of an electrical power grid and that includes a synchronized timestamp for the measurements. The method further includes causing the complete message to be transmitted, via a public communication network and according to a streaming protocol, as one or more outbound streaming data packets that correspond to the complete message and that each include the synchronized timestamp. The method further includes receiving an assembled inbound complete message that includes the synchronized timestamp and one or more control parameters. The assembled inbound complete message is assembled, according to the streaming data protocol, from inbound streaming data packets that are transmitted via the public communication network responsive to a parent controller determining the one or more control parameters based on an assembly of the outbound streaming data packets. The assembled inbound complete message includes the synchronized timestamp in response to the outbound streaming data packets, based on which the one or more control parameters are determined, each also including the synchronized timestamp. The method further includes generating, based on the control parameters and the synchronized timestamp of the assembled inbound complete message, one or more control actions to achieve the control parameters, the one or more control actions including a control action for an automatically controllable resource of the one or more electrical resources. The method further includes sending the control action to the automatically controllable resource.

These and other implementations of the technology disclosed herein can include one or more of the following features.

In some implementations, the one or more control parameters include a power flow setpoint and wherein the one or more control actions achieve the power flow setpoint.

In some implementations, generating, based on the control parameters and the synchronized timestamp of the assembled inbound complete message, the one or more control actions includes determining, based on comparing the synchronized timestamp to a current timestamp, whether to generate the one or more control actions.

In some implementations, generating, based on the control parameters and the synchronized timestamp of the assembled inbound complete message, the one or more control actions includes determining, based on the synchronized timestamp, a timing parameter used in sending the control action to the automatically controllable resource.

In some implementations, generating, based on the control parameters and the synchronized timestamp of the assembled inbound complete message, the one or more control actions includes determining, based on the synchronized timestamp, one or more additional control parameters based on which to generate the one or more control actions.

In some implementations, the one or more processors are of a first real or virtual microgrid and the one or more control parameters are determined by the parent controller further based at least in part on an additional assembly of one or more additional outbound streaming data packets form a second real or virtual microgrid.

In some implementations, the method further includes: generating an additional complete message that includes one or more additional measurements for the one or more electrical resources and that includes an additional synchronized timestamp for the additional measurements; causing the additional complete message to be transmitted, via the public communication network and according to the streaming protocol, as one or more additional outbound streaming data packets that correspond to the additional complete message and that each include the additional synchronized timestamp; receiving an additional assembled inbound complete message that includes the additional synchronized timestamp and one or more additional control parameters; and generating, based on the additional control parameters and the additional synchronized timestamp of the additional assembled inbound complete message, one or more additional control actions to achieve the additional control parameters, where the one or more additional control actions include an additional control action for the automatically controllable resource; and sending the additional control action to the automatically controllable resource. The additional assembled inbound complete message is assembled, according to the streaming data protocol, from additional inbound streaming data packets that are transmitted via the public communication network responsive to the parent controller determining the one or more additional control parameters based on an assembly of the additional outbound streaming data packets. The additional assembled inbound complete message includes the additional synchronized timestamp in response to the additional outbound streaming data packets each also including the synchronized timestamp. In some of those implementations, the additional synchronized timestamp is within one thirtieth of a second of the synchronized timestamp and/or the transmission of the additional complete message is within one thirtieth of a second of transmission of the complete message.

In some implementations, a system is provided that includes memory storing instructions and one or more processors operable to execute the instructions to: receive, through a public communication network, inbound streaming data packets transmitted over the public communication network according to a streaming data protocol, where the inbound streaming data packets include a set of inbound data packets that correspond to, and were transmitted through the public communication network responsive to, a complete inbound message from a resource of an electrical power grid; assemble, according to the streaming data protocol, the inbound streaming data packets into one or more inbound complete messages, where in assembling the streaming data packets into one or more inbound complete messages one or more of the processors are to: assemble the set of inbound data packets into the inbound complete message, communicate the one or more inbound complete messages to a controller, receive, from the controller, power setpoint data that is generated by the controller based at least in part on the one or more complete messages, generate, according to the streaming protocol, one or more outbound streaming data packets that correspond to the power setpoint data, and transmit the one or more outbound streaming data packets through the public communication network. Transmitting the one or more outbound streaming data packets through the public communication network causes adjustment of the electrical resource and/or causes adjustment of one or more additional electrical resources of the electrical power grid.

Other implementations can include a non-transitory computer readable storage medium storing instructions executable by one or more processor(s) (e.g., a central processing unit(s) (CPU(s)), graphics processing unit(s) (GPU(s)), and/or tensor processing unit(s) (TPU(s))) to perform a method such as one or more of the methods described herein. Yet other implementations can include a system of one or more computers that include one or more processors operable to execute stored instructions to perform a method such as one or more of the methods described herein.

What is claimed is:

1. A method implemented by one or more processors, the method comprising:
receiving an assembled inbound complete message that characterizes a measurement from a resource of an electrical power grid and that includes a synchronized timestamp of the measurement, wherein the assembled inbound complete message is assembled, according to a streaming data protocol, from inbound streaming data packets that are transmitted via a public communication network responsive to the measurement from the resource, and wherein the assembled inbound complete message includes the synchronized timestamp of the measurement in response to the inbound streaming data packets each also including the synchronized timestamp;

communicating the assembled inbound complete message to a controller;

receiving, from the controller, one or more control parameters that are generated by the controller based on the assembled inbound complete message;

generating an outbound complete message that includes the one or more control parameters and that includes the synchronized timestamp of the measurement, wherein generating the outbound complete message comprises including the synchronized timestamp of the measurement, in the outbound complete message, based on the one or more control parameters being generated based on the assembled inbound complete message; and causing the outbound complete message to be transmitted, via the public communication network and according to the streaming protocol, as one or more outbound streaming data packets that each include the synchronized timestamp of the measurement, wherein transmission of the one or more outbound streaming data packets causes adjustment, of the electrical resource and/or of one or more additional electrical resources of the electrical power grid, in accordance with the one or more control parameters.

2. The method of claim 1, wherein the synchronized timestamp is synchronized to a Global Positioning System (GPS) clock or to a standalone precision clock.

3. The method of claim 2, wherein the inbound streaming data packets are transmitted, according to the streaming protocol, in response to generation of a complete message that includes the measurement and the synchronized timestamp of the measurement.

4. The method of claim 3, wherein the complete message is generated by the resource responsive to taking the measurement at a time of the synchronized timestamp.

5. The method of claim 1, further comprising:

receiving an additional assembled inbound complete message that characterizes an additional measurement from the resource and that includes an additional synchronized timestamp of the additional measurement, wherein the additional synchronized timestamp is within one second of the synchronized timestamp, wherein the additional assembled inbound complete message is assembled, according to the streaming data protocol, from additional inbound streaming data packets that are transmitted over a public communication network responsive to the additional measurement from the resource, and wherein the additional assembled inbound complete message includes the additional synchronized timestamp of the measurement in response to the additional inbound streaming data packets each also including the additional synchronized timestamp;

communicating the additional assembled inbound complete message to the controller;

receiving, from the controller, one or more additional control parameters that are generated by the controller based at least in part on the additional assembled inbound complete message;

generating an additional outbound complete message that includes the one or more additional control parameters and that includes the additional synchronized timestamp of the additional measurement; and causing the additional outbound complete message to be transmitted, via the public communication network and according to the streaming protocol, as one or more additional outbound streaming data packets that each include the additional synchronized timestamp of the additional measurement, wherein transmission of the one or more additional outbound streaming data packets causes adjustment, of the electrical resource and/or of one or more additional electrical resources of the electrical power grid, in accordance with the one or more additional control parameters.

6. The method of claim 5, wherein the additional synchronized timestamp is within one thirtieth of a second of the synchronized timestamp.

7. The method of claim 6, wherein transmission of the one or more additional outbound streaming data packets occurs within one thirtieth of a second of transmission of the one or more outbound streaming data packets.

8. The method of claim 1, wherein transmission of the outbound streaming data packets occurs within one second of receiving the inbound complete message.

9. The method of claim 1, wherein the inbound complete message is a synchrophasor message and wherein the inbound streaming data packets each include a given header and a corresponding segment of the synchrophasor message.

10. The method of claim 1, wherein the inbound data packets are assembled into the inbound complete message based on:

identification, based on the inbound data packets, of a data message format; and use of the identified data message format in assembling the inbound data packets into the inbound complete message.

11. The method of claim 1, wherein the controller is a parent controller and wherein the one or more outbound streaming data packets are transmitted via the public communication network to a bidirectional streaming data handler (BSDH) of a child controller, wherein one or more certain resources, that include one or more of the additional electrical resources and/or that include the resource, are controlled by the child controller.

12. The method of claim 11, wherein the BSDH of the child controller receives the one or more outbound streaming data packets, assembles the received outbound streaming data packets according to the streaming data protocol, and causes sending, to the certain resources that are topologically behind the child controller, of corresponding of one or more of the control parameters based on the assembly of the received outbound streaming data packets.

13. The method of claim 11, wherein the resource is included in the certain resources that are controlled by the child controller and wherein the BSDH of the child controller received a complete inbound message from the electrical resource, generated the inbound data packets based on the complete inbound message according to the streaming protocol, and transmitted the inbound data packets via the public communication network.

14. The method of claim 11, wherein the one or more outbound streaming data packets are further transmitted via the public communication network to an additional BSDH of an additional child controller.

15. The method of claim 1, wherein the one or more control parameters include set point data.

16. The method of claim 15, wherein the set point data includes a power setpoint, a voltage setpoint, a frequency setpoint, and/or an angle setpoint.

17. The method of claim 1, wherein the one or more control parameters include a real and reactive power dispatch signal that is for a generator of the certain resources or is for a grid-following inverter of the certain resources.

18. The method of claim 1, wherein the public communication network is the Internet public network, and is not a virtual private network.

19. The method of claim 1, wherein the resource is a real or virtual sensor, wherein transmission of the one or more outbound streaming data packets via the public communication network causes adjustment of one or more of the additional electrical resources, including:
 a real microgrid,
 a virtual microgrid,
 a battery,
 an energy storage unit,
 a generator,
 a solar power plant,
 a wind power plant,
 an electric vehicle charging system,
 an air conditioning unit,
 a washer,
 a dryer,
 a refrigerator, and/or
 a pool pump.

20. A method implemented by one or more processors, the method comprising:
 generating a complete message that includes one or more measurements for one or more electrical resources of an electrical power grid and that includes a synchronized timestamp for the measurements;
 causing the complete message to be transmitted, via a public communication network and according to a streaming protocol, as one or more outbound streaming data packets that correspond to the complete message and that each include the synchronized timestamp;
 receiving an assembled inbound complete message that includes the synchronized timestamp and one or more control parameters,
  wherein the assembled inbound complete message is assembled, according to the streaming data protocol, from inbound streaming data packets that are transmitted via the public communication network responsive to a parent controller determining the one or more control parameters based on an assembly of the outbound streaming data packets, and
  wherein the assembled inbound complete message includes the synchronized timestamp in response to the outbound streaming data packets, based on which the one or more control parameters are determined, each also including the synchronized timestamp;
 generating, based on the control parameters and the synchronized timestamp of the assembled inbound complete message, one or more control actions to achieve the control parameters, the one or more control actions including a control action for an automatically controllable resource of the one or more electrical resources; and
 sending the control action to the automatically controllable resource.

21. The method of claim 20, wherein the one or more control parameters include a power flow setpoint and wherein the one or more control actions achieve the power flow setpoint.

22. The method of claim 20, wherein generating, based on the control parameters and the synchronized timestamp of the assembled inbound complete message, the one or more control actions comprises:
 determining, based on comparing the synchronized timestamp to a current timestamp, whether to generate the one or more control actions.

23. The method of claim 20, wherein generating, based on the control parameters and the synchronized timestamp of the assembled inbound complete message, the one or more control actions comprises:
 determining, based on the synchronized timestamp, a timing parameter used in sending the control action to the automatically controllable resource.

24. The method of claim 20, wherein generating, based on the control parameters and the synchronized timestamp of the assembled inbound complete message, the one or more control actions comprises:
 determining, based on the synchronized timestamp, one or more additional control parameters based on which to generate the one or more control actions.

25. The method of claim 20, wherein the one or more processors are of a first real or virtual microgrid and wherein the one or more control parameters are determined by the parent controller further based at least in part on an additional assembly of one or more additional outbound streaming data packets form a second real or virtual microgrid.

26. The method of claim 20, further comprising:
 generating an additional complete message that includes one or more additional measurements for the one or more electrical resources and that includes an additional synchronized timestamp for the additional measurements;
 causing the additional complete message to be transmitted, via the public communication network and according to the streaming protocol, as one or more additional outbound streaming data packets that correspond to the additional complete message and that each include the additional synchronized timestamp;
 receiving an additional assembled inbound complete message that includes the additional synchronized timestamp and one or more additional control parameters,
  wherein the additional assembled inbound complete message is assembled, according to the streaming data protocol, from additional inbound streaming data packets that are transmitted via the public communication network responsive to the parent controller determining the one or more additional control parameters based on an assembly of the additional outbound streaming data packets, and
  wherein the additional assembled inbound complete message includes the additional synchronized timestamp in response to the additional outbound streaming data packets each also including the synchronized timestamp;
 generating, based on the additional control parameters and the additional synchronized timestamp of the additional assembled inbound complete message, one or more additional control actions to achieve the additional control parameters, the one or more additional control actions including an additional control action for the automatically controllable resource; and sending the additional control action to the automatically controllable resource.

27. The method of claim 25, wherein the additional synchronized timestamp is within one thirtieth of a second of the synchronized timestamp.

28. The method of claim 25, wherein transmission of the additional complete message is within one thirtieth of a second of transmission of the complete message.

29. The method of claim 20, wherein the automatically controllable electrical resource is:
   a real microgrid,
   a virtual microgrid,
   a battery,
   an energy storage unit,
   a generator,
   a solar power plant,
   a wind power plant,
   an electric vehicle charging system,
   an air conditioning unit,
   a washer,
   a dryer,
   a refrigerator, or
   a pool pump.

30. A system, comprising:
   memory storing instructions;
   one or more processors operable to execute the instructions to:
      receive, through a public communication network, inbound streaming data packets transmitted over the public communication network according to a streaming data protocol,
      wherein the inbound streaming data packets include a set of inbound data packets that correspond to, and were transmitted through the public communication network responsive to, a complete inbound message from a resource of an electrical power grid;
   assemble, according to the streaming data protocol, the inbound streaming data packets into one or more inbound complete messages, wherein in assembling the streaming data packets into one or more inbound complete messages one or more of the processors are to:
      assemble the set of inbound data packets into the inbound complete message;
   communicate the one or more inbound complete messages to a controller;
   receive, from the controller, power setpoint data that is generated by the controller based at least in part on the one or more complete messages;
   generate, according to the streaming protocol, one or more outbound streaming data packets that correspond to the power setpoint data; and
   transmit the one or more outbound streaming data packets through the public communication network, wherein transmitting the one or more outbound streaming data packets through the public communication network causes adjustment of the electrical resource and/or causes adjustment of one or more additional electrical resources of the electrical power grid.

* * * * *